United States Patent
Endo (10) Patent No.: US 8,724,128 B2
(45) Date of Patent: May 13, 2014

(54) IMAGE READING DEVICE AND IMAGE FORMING APPARATUS

(75) Inventor: Sasuke Endo, Kanagawa-ken (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 286 days.

(21) Appl. No.: 13/239,296

(22) Filed: Sep. 21, 2011

(65) Prior Publication Data

US 2012/0081733 A1    Apr. 5, 2012

Related U.S. Application Data

(60) Provisional application No. 61/389,712, filed on Oct. 4, 2010.

(51) Int. Cl.
*G06F 3/12* (2006.01)
*H04N 1/04* (2006.01)
*H04N 1/113* (2006.01)
*G06K 15/00* (2006.01)

(52) U.S. Cl.
CPC .............. *H04N 1/1135* (2013.01); *G06K 15/00* (2013.01)
USPC ........................... 358/1.13; 358/481; 358/484

(58) Field of Classification Search
USPC ........ 358/1.13, 401, 501, 505, 509, 511, 513, 358/474, 481, 484
See application file for complete search history.

(56) References Cited

U.S. PATENT DOCUMENTS

| | | | | |
|---|---|---|---|---|
| 5,140,411 | A * | 8/1992 | Haneda et al. | 358/500 |
| 6,627,902 | B2 * | 9/2003 | Ishidoya et al. | 250/484.5 |
| 6,831,760 | B2 * | 12/2004 | Kimura | 358/483 |
| 7,209,268 | B2 * | 4/2007 | Ikeda | 358/475 |
| 7,942,561 | B2 * | 5/2011 | Ishimaru et al. | 362/551 |
| 2003/0095345 | A1 * | 5/2003 | Yoshida | 359/819 |
| 2009/0003016 | A1 * | 1/2009 | Ishimaru et al. | 362/617 |
| 2010/0265551 | A1 | 10/2010 | Endoh | |
| 2011/0007295 | A1 * | 1/2011 | Ichinose | 355/72 |
| 2013/0009037 | A1 * | 1/2013 | Takahashi | 250/208.1 |

FOREIGN PATENT DOCUMENTS

| | | | | |
|---|---|---|---|---|
| JP | 2002-243946 A | | 8/2002 | |
| JP | 2005-07314 | * | 3/2005 | .............. H04N 1/04 |
| JP | 2010-103742 A | | 5/2010 | |

* cited by examiner

*Primary Examiner* — Jerome Grant, II
(74) *Attorney, Agent, or Firm* — Patterson & Sheridan LLP (57) ABSTRACT

An image reading device includes: a light source which generates light used for reading an image; a light guide prism which extends in a main scanning direction and guides the light from the light source toward an image reading region; a holding unit which is connected to a part of the light guide prism to hold the light guide prism, has a wall surface distant from at least one end surface of the light guide prism at a position facing the end surface of the light guide prism in the main scanning direction, and has a linear expansion coefficient smaller than that of the light guide prism; and an image sensor which photoelectrically converts reflected light from the image reading region and outputs image data corresponding to the read image.

20 Claims, 5 Drawing Sheets

IMAGE READING DEVICE AND IMAGE FORMING APPARATUS

CROSS-REFERENCE TO RELATED APPLICATION

This application is based upon and claims the benefit of priority from: U.S. provisional application 61/389,712, filed on Oct. 4, 2010, the entire contents of which are incorporated herein by reference.

FIELD

Embodiments described herein relate generally to an image reading device and an image forming apparatus.

BACKGROUND

In an image reading device used in a digital multifunction peripheral, in order to read an image for one line extending in a main scanning direction, linear light extending in the main scanning direction is irradiated from a light source to an original document and reflected light from the original document is condensed by a lens and made incident on an image sensor.

When the light from the light source is made to reach the original document, a prism may be used. The prism is received in a case. When the linear expansion coefficient of the prism is larger than the linear expansion coefficient of the case, there is a concern that the prism may collide against the case due to thermal deformation of the prism. When the prism is curved, the illumination characteristics for the original document may be badly influenced.

DETAILED DESCRIPTION

According to exemplary embodiments, an image reading device includes: a light source, a light guide prism, and a holding unit, and an image sensor. The light source generates light used for reading an image. The light guide prism extends in a main scanning direction and guides the light from the light source toward an image reading region. The holding unit is connected to a part of the light guide prism to hold the light guide prism and has a linear expansion coefficient smaller than that of the light guide prism. The holding unit has a wall surface distant from at least one end surface of the light guide prism at a position facing the end surface of the light guide prism in the main scanning direction. The image sensor which photoelectrically converts reflected light from the image reading region and outputs image data corresponding to the read image.

First Embodiment

Figure 1:
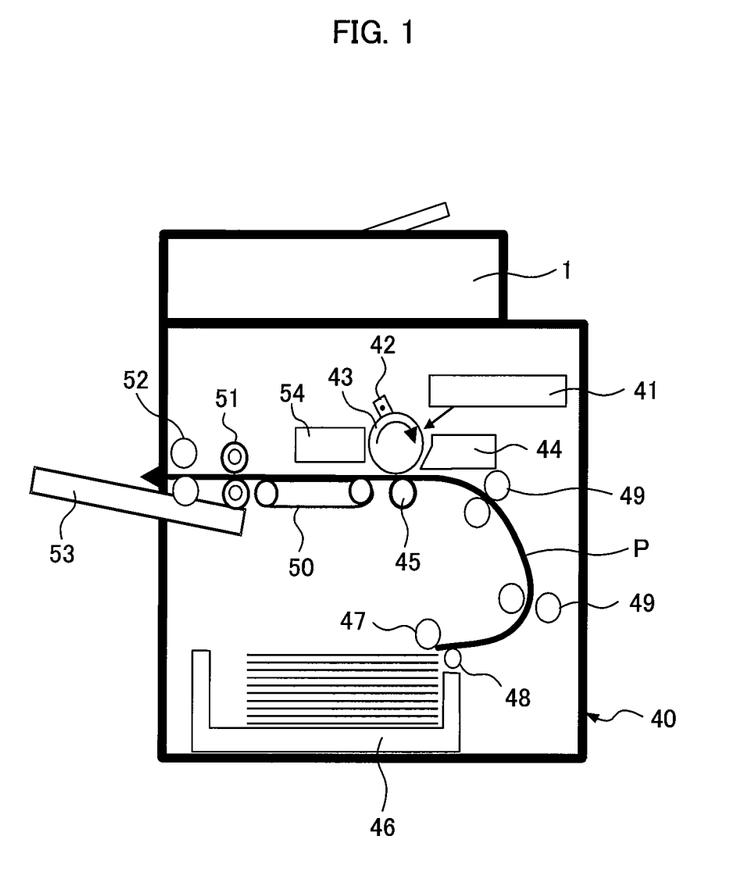
FIG. 1 is a diagram of the configuration of an image forming apparatus according to a first embodiment.

An image forming apparatus (MFP: MultiFunction Peripheral) according to a first embodiment is explained with reference to FIG. 1. FIG. 1 is a schematic diagram of the internal structure of an image forming apparatus 40.

The image forming apparatus 40 includes a paper feeding cassette 46. The paper feeding cassette 46 stores plural sheets. A paper feeding roller 47 and a separation roller 48 separate the plural sheets stored in the paper feeding cassette 46 one by one and feed the sheet to a sheet conveying path P. The sheet conveying path P includes plural conveying rollers 49. An image is formed on the sheet while the sheet passes through the sheet convey path P.

A charging device 42 charges the surface of a photoconductive drum 43. The photoconductive drum 43 rotates in a direction indicated by an arrow. A light scanning device 41 irradiates a laser beam on a photoconductive surface of the photoconductive drum 43 to thereby form an electrostatic latent image corresponding to image data on the photoconductive surface. Examples of the image data include image data transmitted from an external apparatus (e.g., a person computer) to the image forming apparatus 40 and the image data generated by a reading operation of an image reading device 1.

A developing device 44 supplies a toner to the surface of the photoconductive drum 43 and forms a toner image. A transfer device 45 transfers the toner image formed on the surface of the photoconductive drum 43 onto a sheet. A cleaning device 54 removes the toner remaining on the surface of the photoconductive drum 43.

In this embodiment, the toner image formed on the photoconductive drum 43 is transferred onto the sheet. However, the toner image formed on the photoconductive drum 43 can be transferred onto an intermediate transfer belt and then transferred from the intermediate transfer belt onto the sheet.

A conveying device 50 conveys the sheet having the toner image transferred thereon to a fixing device 51. The fixing device 51 heats the sheet to thereby fix the toner image on the sheet. A paper discharge roller 52 moves the sheet, which is received from the fixing device 51, to a tray 53. The sheet discharged from the paper discharge roller 52 is stacked on the tray 53.

The image reading device 1 scans an image of an original document to thereby generate image data. In this embodiment, the image reading device 1 is provided in the image forming apparatus 40 functioning as a digital multifunction peripheral. This embodiment can also be applied when the image reading device 1 is provided in an image forming apparatus functioning as a digital copying machine and when a product includes only the image reading device 1.

Figure 2:
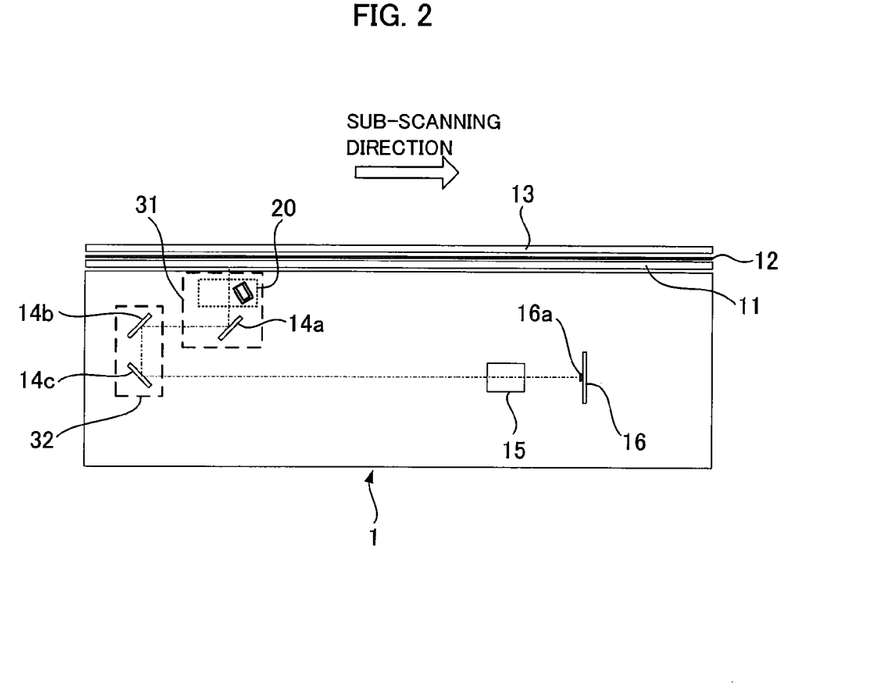
FIG. 2 is a sectional view of an image reading device according to the first embodiment.

The configuration of the image reading device 1 is explained with reference to FIG. 2. FIG. 2 is a sectional view of the image reading device 1 along a sub-scanning direction.

An original document 12 is placed on the upper surface of a platen glass 11. A reading surface of the original document 12 is opposed to the upper surface of the platen glass 11. A platen cover 13 can rotate with respect to a main body of the image reading device 1. The platen cover 13 moves between a position where the upper surface of the platen glass 11 is open and a position where the upper surface of the platen glass 11 is closed. The paten cover 13 is moved to the close position, whereby the original document 12 is pressed against the platen glass 11. The platen cover 13 can be provided in an ADF (Auto Document Feeder). The ADF automatically conveys the original document 12 to the image reading device 1.

A lighting device 20 irradiates illumination light on the original document 12. The lighting device 20 extends in a direction orthogonal to a paper surface of FIG. 2 (a main scanning direction) and irradiates linear illumination light extending in the main scanning direction. The linear illumination light reaches an image region of the original document 12 for one line extending in the main scanning direction.

The illumination light of the lighting device 20 is reflected on the original document 12. The reflected light from the original document 12 is reflected on return mirrors 14a, 14b, and 14c and travels to a focusing lens 15. The focusing lens 15 condenses the light reflected from the return mirror 14c and focuses the light on an image sensor 16. The image sensor 16 includes plural light receiving elements 16a arrayed in the direction orthogonal to the paper surface of FIG. 2. The plural light receiving elements 16a are arranged to correspond to linear illumination light and arranged to be capable of receiving the linear illumination light. The respective light receiving elements 16a output electric signals corresponding to an incident light amount by performing photoelectric conversion. As the image sensor 16, for example, a CCD (Charge Coupled Device) sensor can be used.

The reflected light from the original document 12 is made incident on the plural light receiving elements 16a, whereby an image region of the original document 12 for one line extending in the main scanning direction can be read.

A first carriage 31 supports the lighting device 20 and the return mirror 14a and moves in the sub-scanning direction. A second carriage 32 supports the return mirrors 14b and 14c and moves in the sub-scanning direction.

The first carriage 31 and the second carriage 32 relatively move each other in the sub-scanning direction and maintains optical path length from the surface (reflecting surface for illumination light) of the original document 12 to a focusing surface of the image sensor 16 constant.

For example, moving speeds in the sub-scanning direction in the first carriage 31 and the second carriage 32 can be set to a speed ratio of "2:1 (=first carriage 31: second carriage 32)". The first carriage 31 and the second carriage 32 move in the sub-scanning direction in synchronization with timing for reading an image in the image sensor 16 (a signal for controlling output of the image sensor 16).

The illumination light irradiated from the lighting device 20 can be scanned in the sub-scanning direction by moving the first carriage 31 and the second carriage 32. While the first carriage 31 and the second carriage 32 are moved in the sub-scanning direction, the image region of the original document 12 for one line extending in the main scanning direction is sequentially read. The entire surface of the original document 12 can be read by sequentially reading the image region for one line.

Figure 3:
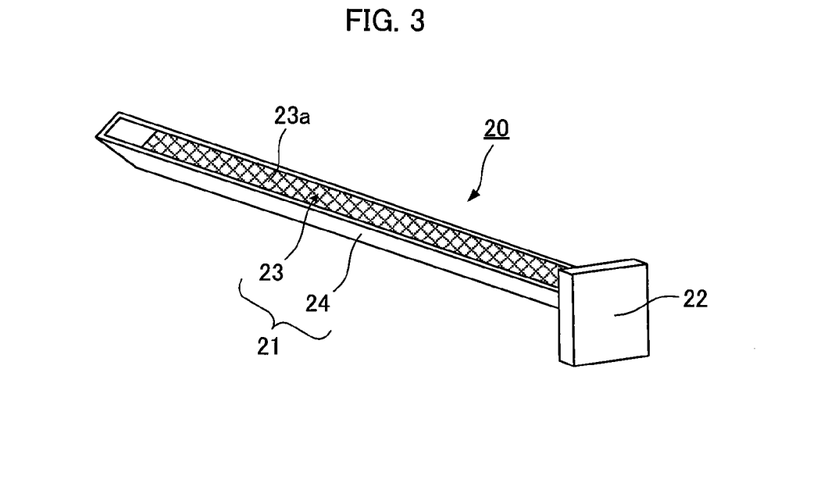
FIG. 3 is a perspective view of a lighting device according to the first embodiment.

The structure of the lighting device 20 is explained with reference to FIGS. 3 and 4. FIG. 3 is a perspective view of the lighting device 20 taken along a surface orthogonal to a longitudinal direction of the lighting device 20.

Figure 4:
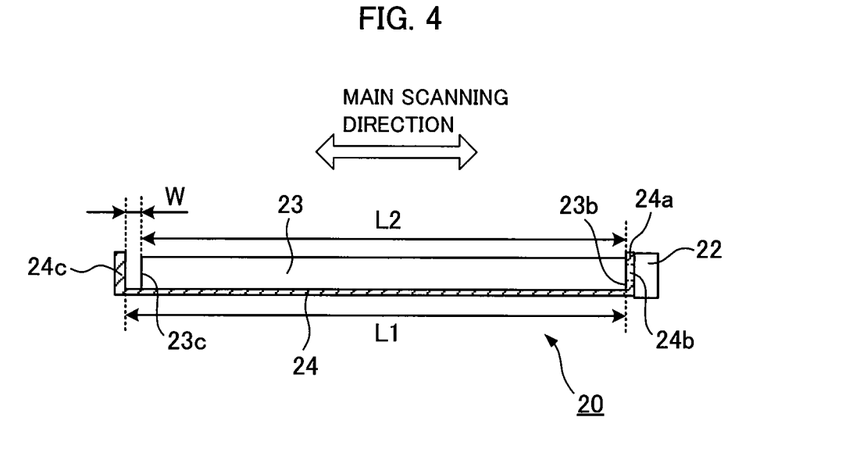
FIG. 4 is a sectional view of the lighting device in a main scanning direction according to the first embodiment.

FIG. 4 is a sectional view of the light device 20 cut in the main scanning direction.

The lighting device 20 includes a light guide 21 extending in the main scanning direction (a predetermined direction) and a light source 22 fixed to one end of the light guide 21 in the longitudinal direction thereof. As the light source 22, for example, a light emitting diode (LED) can be used. One or plural light emitting diodes can be provided. The length of the light guide 21 in the main scanning direction corresponds to the length of the original document 12 in the main scanning direction.

The light guide 21 includes a light guide prism 23 and a case 24 configured to house the light guide prism 23. The case 24 covers a region of the light guide prism 23 other than an emitting surface 23a.

The light guide prism 23 can be formed of resin having high light transmittance such as acryl or polycarbonate or optical glass. The light guide prism 23 extends in the main scanning direction.

As shown in FIG. 4, one end surface 23b of the light guide prism 23 in the main scanning direction is fixed to a first side wall 24a of the case 24. Specifically, the end surface 23b of the light guide prism 23 comes into contact with the surface (inner wall surface) of the first side wall 24a on inside of the case 24.

For example, an adhesive can be used as a fixing portion of the light guide prism 23 and the case 24. The end surface 23b of the light guide prism 23 is fixed to the first side wall 24a of the case 24 by various fixing portions. The end surface 23b of the light guide prism 23 face the first side wall 24a in the main scanning direction.

The light source 22 is also fixed to the first side wall 24a. Specifically, the light source 22 comes into contact with the surface (outer wall surface) of the first side wall 24a on the outside of the case 24. For example, an adhesive can be used as a fixing portion of the light source 22 and the first wall side 24a. The light source 22 and the first side wall 24a may be fixed to each other by various fixing portions.

An opening 24b is formed in the first side wall 24a. The opening 24b is used to guide emitted from the light source 22 toward the light guide prism 23. The light emitted from the light source 22 passes through the opening 24b of the first side wall 24a and is incident on the inside of the light guide prism 23 from an end surface (incident surface) 23b of the light guide prism 23.

The light incident on the light guide prism 23 travels in the longitudinal direction of the light guide prism 23, while being reflected or diffused inside the light guide prism 23. In the light guide prism 23, a region reflecting the light can be configured by, for example, a minute unevenness or printing.

The light incident on the light guide prism 23 may be emitted from a region different from the emitting surface 23a to the outside of the light guide prism 23. Since the case 24 covers the external surface of the light guide prism 23 except for the emitting surface 23a, the light emitted from the light guide prism 23 reaches the case 24. The case 24 reflects the light emitted from the light guide prism 23 toward the light guide prism 23. That is, the light emitted from the light guide prism 23 is returned toward the inside of the light guide prism 23 by the case 24.

The case 24 is formed of a metal plate with high reflectance. As the metal plate, for example, an aluminum plate or a stainless steel plate may be used. The case 24 can be formed of a white resin and a reflective paint can be applied to the inner wall surface (surface facing the light guide prism 23) of the case 24.

The case 24 may reflect the light not oriented toward an illumination region in the light emitted from the light guide prism 23. The illumination region is a region where the light is illuminated toward the original document 12. The illumination region corresponds to an image reading region. In consideration of manufacturing error of the image reading device 1 or a deviation of the illumination region caused due to vibration or the like of the carriages 31 and 32, the illumination region is preferably larger than the image reading region in order to stably illuminate the light toward the image reading region.

When the light not traveling toward the illumination region has no bad influence on the performance of the lighting device 20, the case 24 may be omitted.

The light reflected or diffused inside the light guide prism 23 is emitted from the emitting surface 23a. The light emitted from the emitting surface 23a travels toward the original document 12. The shape of the emitting surface 23a can appropriately be set. For example, the emitting surface 23a may have a convex surface or a concave surface. The shape of the emitting surface 23a can appropriately be set based on, for example, a relationship between the optical characteristics of the emitting surface 23a and the illumination region.

In the exemplary embodiment, the light emitted from the emitting surface 23a of the light guide prism 23 is made to directly reach the original document 12. On the other hand, the light emitted from the light guide prism 23 can be made to reach the original document 12 via an optical system. A mirror or a lens can be used as the optical system.

When the structure of the light guide prism 23 is modified, the light emitted from the light guide prism 23 can be divided into a light component directly reaching to the original document 12 and a light component traveling toward the optical system. The light can be emitted toward the original document 12 in different directions and irregularity of an illumination distribution can be suppressed in the original document 12 by dividing the light emitted from the light guide prism 23 into the plurality of light components.

In FIG. 4, L1 is a distance between a pair of side walls 24a and 24c of the case 24. The side walls 24a and 24c face each other in the main scanning direction. Specifically, L1 is a distance of the inner wall surface of the first side wall 24a and the inner wall surface of the second side wall 24c. L2 is the length of the light guide prism 23 in the main scanning direction.

The length L2 is shorter than the length L1. The end surface 23b of the light guide prism 23 comes into contact with the first side wall 24a of the case 24 in the main scanning direction. An end surface 23c of the light guide prism 23 in the main scanning direction is distant from the second side wall 24c of the case 24. A space with a length W is formed between the end surface 23c of the light guide prism 23 and the second side wall 24c of the case 24. The length W corresponds to a difference between the lengths L1 and L2.

The linear expansion coefficient of the light guide prism 23 is larger than the linear expansion coefficient of the case 24. In some cases, the light guide prism 23 and the case 24 are deformed with an increase in temperature or are expanded in the main scanning direction. Here, a deformation amount (expansion amount) of the light guide prism 23 in the main scanning direction is larger than a deformation amount (expansion amount) of the case 24 in the main scanning direction.

In the exemplary embodiment, the space with the length W is formed between the light guide prism 23 and the case 24. Accordingly, if the light guide prism 23 is deformed, the light guide prism 23 can be prevented from colliding against the second side wall 24c of the case 24.

If the light guide prism 23 collides against the second side wall 24c of the case 24, stress may be generated in the light guide prism 23 and the light guide prism 23 may be curved in some cases. If the light guide prism 23 is curved, the illumination characteristics of the lighting device 20 may be badly influenced.

In the exemplary embodiment, since the light guide prism 23 is allowed to be deformed using the space with the length W, the light guide prism 23 can be prevented from being curved.

The length W preferably has a relationship of Expression (1) below.

$$W = L1 - L2 \geq (\alpha 2 \times L2 - \alpha 1 \times L1)\Delta T \quad (1)$$

In Expression (1), $\alpha 1$ is the linear expansion coefficient of the case 24 and $\alpha 2$ is the linear expansion coefficient of the light guide prism 23. Further, $\Delta T$ is a variation (absolute value) in temperature under the ambient environment of the light guide prism 23 and the case 24. The value of $\Delta T$ can be specified in advance based on the use environment of the lighting device 20.

As shown in Expression (1), when the length W is set, the light guide prism 23 can be inhibited from colliding against the second side wall 24c of the case 24 and being curved in spite of the fact that the light guide prism 23 is thermally deformed.

Figure 5:
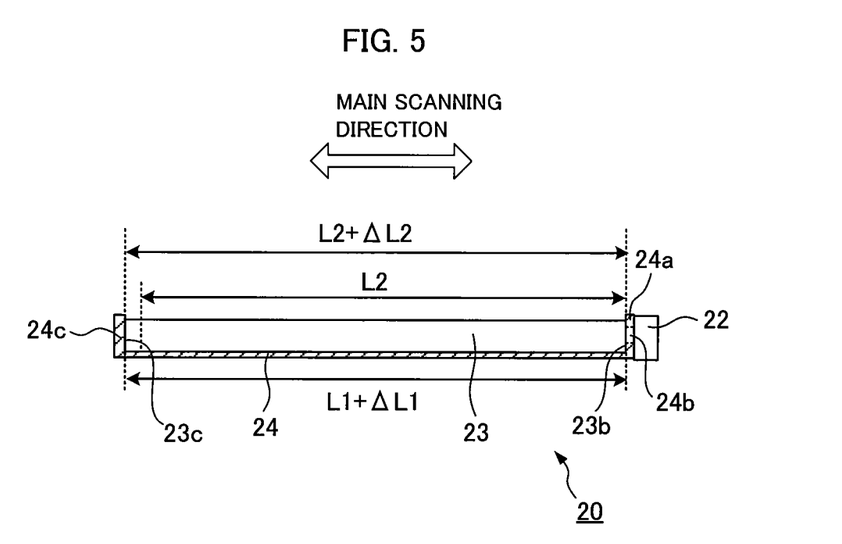
FIG. 5 is a sectional view illustrating the lighting device when the light guide prism and the case are thermally expanded according to the first embodiment.

FIG. 5 is a diagram of a case where the light guide prism 23 and the case 24 are thermally expanded. The length (length in the main scanning direction) of the thermally expanded case 24 is "L1+$\Delta$L1." Here, $\Delta$L1 is a deformation amount (expansion amount) of the case 24. The length (length in the main scanning direction) of the thermally expanded light guide prism 23 is "L2+$\Delta$L2." Here, $\Delta$L2 is a deformation amount (expansion amount) of the light guide prism 23.

In the exemplary embodiment, "L2+$\Delta$L2" is the same as "L1+$\Delta$L1" or is shorter than "L1+$\Delta$L1."

Second Exemplary Embodiment

Figure 6:
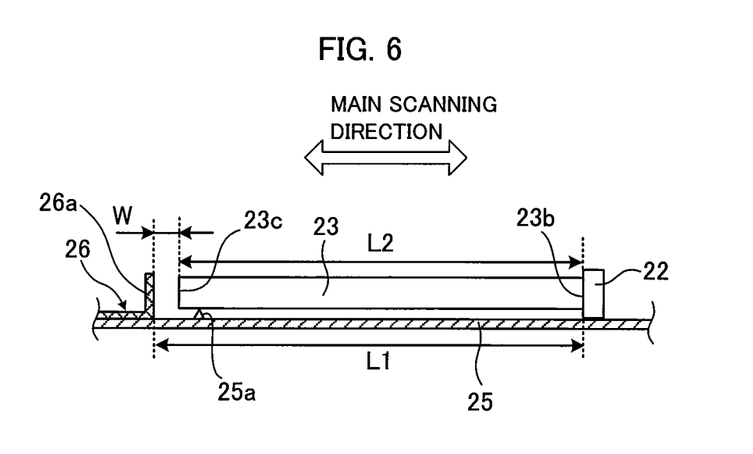
FIG. 6 is a sectional view of a lighting device in the main scanning direction according to a second embodiment.

In the first exemplary embodiment, the light guide prism 23 is received in the case 24. However, in this exemplary embodiment, the light guide prism 23 is not received in the case. FIG. 6 is a schematic diagram of the configuration of the lighting device 20 according to this exemplary embodiment.

The light source 22 is attached to the end surface 23b of the light guide prism 23. The light source 22 and the light guide prism 23 are disposed on the upper surface of a base member 25. The light source 22 is fixed to the base member 25. The case of the light source 22 holds the end surface 23b of the light guide prism 23 on the upper surface of the base member 25. The base member 25 includes a protrusion portion 25a to hold a predetermined posture state of the light guide prism 23.

The linear expansion coefficient of the base member 25 is smaller than the linear expansion coefficient of the light guide prism 23. The base member 25 may hold the light source 22 and the light guide prism 23 and the shape of the base member 25 can appropriately be set. The protrusion portion 25a may not be formed.

A stopper member 26 is attached to the base member 25. The stopper member 26 is disposed in a line shape extending from the end surface 23c of the light guide prism 23 in the main scanning direction. The stopper member 26 has a side wall 26a facing the end surface 23c of the light guide prism 23 in the main scanning direction.

The side wall 26a of the stopper member 26 is distant from the end surface 23c of the light guide prism 23 by a distance W.

In FIG. 6, a length L1 is a length (length in the main scanning direction) from the light source 22 to the side wall 26a of the stopper member 26. Specifically, the length L1 is a length from the end surface 23b of the light guide prism 23 to the inner wall surface of the side wall 26a. A length L2 is the length of the light guide prism 23 in the main scanning direction. The distance W corresponds to a difference between the lengths L1 and L2.

In this exemplary embodiment, the same advantage as that of the first exemplary embodiment can be obtained. That is, if the light guide prism 23 is deformed due to thermal expansion, the end surface 23c of the light guide prism 23 can be prevented from colliding against the side wall 26a of the stopper member 26, and thus the light guide prism 23 can be prevented from being curved.

Figure 7:
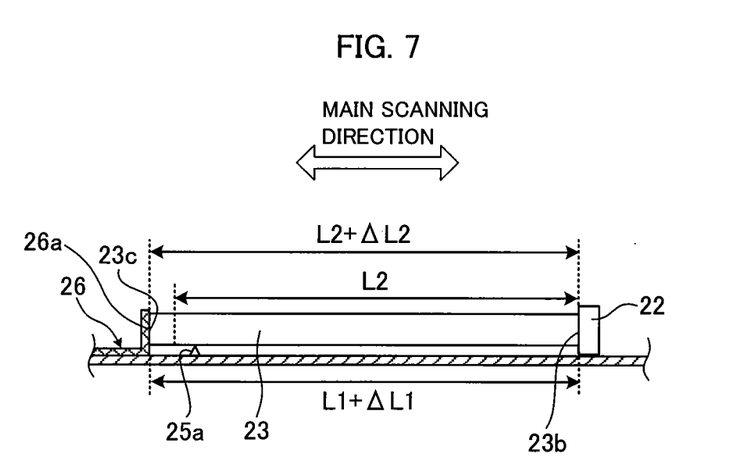
FIG. 7 is a sectional view illustrating the lighting device when the light guide prism and the case are thermally expanded according to the second embodiment.

FIG. 7 is a diagram of a case where the light guide prism 23 and the base member 25 are thermally expanded. A length (length in the main scanning direction) from the end surface 23b of the light guide prism 23 to the side wall 26a of the stopper member 26 is "L1+ΔL1" after the thermal expansion. Here, ΔL1 is a deformation amount (expansion amount) of the base member 25. The length (length in the main scanning direction) of the thermally expanded light guide prism 23 is "L2+ΔL2." Here, ΔL2 is a deformation amount (expansion amount) of the light guide prism 23.

In the exemplary embodiment, "L2+ΔL2" is the same as "L1+ΔL1" or is shorter than "L1+ΔL1."

In this exemplary embodiment, the light source 22 is fixed to the base member 25, but other configuration may be realized. For example, the base member 25 is provided with a vertical wall and the light guide prism 23 and the light source 22 can be attached to the vertical wall. The vertical wall corresponds to the first side wall 24a described in the first exemplary embodiment.

Third Exemplary Embodiment

Figure 8:
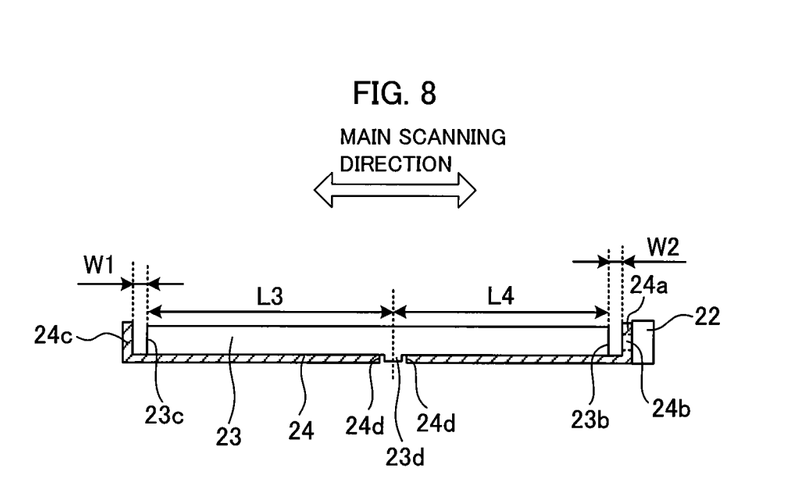
FIG. 8 is a sectional view of a lighting device in the main scanning direction according to a third embodiment.

In the first exemplary embodiment, the end surface 23b of the light guide prism 23 is fixed to the case 24. However, in this exemplary embodiment, a portion different from the end surfaces 23b and 23c in the light guide prism 23 is fixed to the case 24. FIG. 8 is a schematic diagram of the configuration of the lighting device 20 according to this exemplary embodiment.

The case 24 has an opening 24d. The light guide prism 23 has a convex portion 23d infiltrated toward the opening 24d. The convex portion 23d is formed on a surface extending in the main scanning direction in the light guide prism 23.

The end surface 23b of the light guide prism 23 is distant from the first side wall 24a of the case 24 in the main scanning direction. A distance W2 shown in FIG. 8 is a gap between the inner wall surface of the first side wall 24a and the end surface 23b of the light guide prism 23. The end surface 23c of the light guide prism 23 is distant from the second side wall 24c of the case 24. The distance W1 shown in FIG. 8 is the gap between inner wall surface of the second side wall 24c and the end surface 23c of the light guide prism 23.

In FIG. 8, L3 is a length (length in the main scanning direction) from the convex portion 23d to the end surface 23c of the light guide prism 23. L4 is a length (length in the main scanning direction) from the convex portion 23d to the end surface 23b of the light guide prism 23. The sum of the lengths L3 and L4 is the length of the light guide prism 23 in the main scanning direction. The lengths L3 and L4 may be the same as each other or may be different from each other.

The distances W1 and W2 preferably satisfy relationships of Expression (2) below and Expression (3) below.

$$W1 \geq (\alpha2 - \alpha1) \times L3 \times \Delta T/(1 - \alpha1 \times \Delta T) \qquad (2)$$

$$W2 \geq (\alpha2 - \alpha1) \times L4 \times \Delta T/(1 - \alpha1 \times \Delta T) \qquad (3)$$

In Expressions (2) and (3), α1 is the linear expansion coefficient of the case 24, α2 is the linear expansion coefficient of the light guide prism 23. Further, ΔT is a variation (absolute value) in temperature under the ambient environment of the light guide prism 23 and the case 24.

In this exemplary embodiment, since the convex portion 23d engages with the opening 24d, the light guide prism 23 is fixed at the position at which the convex portion 23d is formed. Accordingly, when the light guide prism 23 is thermally expanded, the region corresponding to the length L3 is expanded in the main scanning direction or the region corresponding to the length L4 is expanded in the main scanning direction. When the case 24 is thermally expanded, the case 24 expands with reference to the opening 24d.

On the assumption that the length (length in the main scanning direction) from the convex portion 23d to the inner wall surface of the second side wall 24c is a length L5 of the case 24, the following relationship of Expression (4) is satisfied.

$$L5 + \Delta L5 \geq L3 + \Delta L3 \qquad (4)$$

In Expression (4), ΔL5 is a deformation amount (expansion amount) of the region corresponding to the length L5 in the case 24. Further, ΔL3 is a deformation amount (expansion amount) of the region corresponding to the length L3 in the light guide prism 23. When the relationship of Expression (4) is satisfied, the end surface 23c of the light guide prism 23 can be prevented from colliding against the second side wall 24c, and thus the light guide prism 23 can be prevented from being curved.

Expression (4) can be expressed as Expression (5) below.

$$L3 + W1 \Delta L5 \geq L3 + \Delta L3 \qquad (5)$$

Expression (5) can be modified into Expression (6) below.

$$W1 + \Delta L5 \geq \Delta L3 \qquad (6)$$

The deformation amount ΔL3 can be defined with the linear expansion coefficient α2 of the light guide prism 23, the length L3, and the variation in temperature ΔT. Further, the deformation amount ΔL5 can be defined with the linear expansion coefficient α1 of the case 24, the length L5, and the variation in temperature ΔT. Accordingly, Expression (6) can be expressed as Expression (7) below.

$$W1 + \alpha1(L3 \times W1) \Delta T \geq \alpha2 \times L3 \times \Delta T \qquad (7)$$

Expression (7) can be modified into Expressions (8) to (10) in sequence.

$$W1(1 - \alpha1 \times \Delta T) + \alpha1 \times L3 \times \Delta T \geq \alpha2 \times L3 \times \Delta T \qquad (8)$$

$$W1(1 - \alpha1 \times \Delta T) \geq \alpha2 \times L3 \times \Delta T - \alpha1 \times L3 \times \Delta T \qquad (9)$$

$$W1(1 - \alpha1 \times \Delta T) \geq (\alpha2 - \alpha1) \times L3 \times \Delta T \qquad (10)$$

When Expression (10) is modified, Expression (2) is obtained. Expression (3) is obtained in accordance with the same calculation method.

Figure 9:
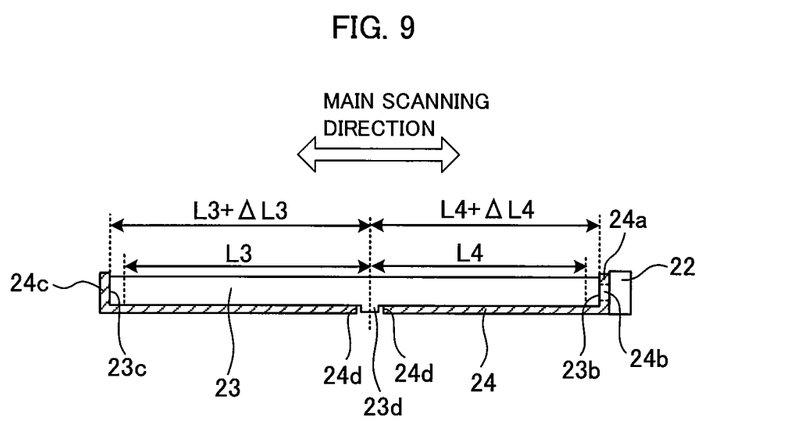
FIG. 9 is a sectional view illustrating the lighting device when the light guide prism and the case are thermally expanded according to the third embodiment.

FIG. 9 is a diagram of a case where the light guide prism 23 and the case 24 are thermally expanded. The length (length in the main scanning direction) from the convex portion 23d to the end surface 23c is "L3+ΔL3" after the thermal expansion. The length (length in the main scanning direction) from the convex portion 23d to the end surface 23b is "L4+ΔL4."

In this exemplary embodiment, the same advantage as that of the first exemplary embodiment can be obtained. That is, when the light guide prism 23 is thermally expanded, the end surface 23b of the light guide prism 23 can be prevented from colliding against the first side wall 24a, and then the light guide prism 23 (region corresponding to the length L4) can be prevented from being curved. The end surface 23c of the light guide prism 23 can be prevented from colliding against the second side wall 24c, and thus the light guide prism 23 (region corresponding to the length L3) can be prevented from being curved.

In this exemplary embodiment, the opening 24d penetrates through the case 24, but may not penetrate the case 24. That is, a concave portion into which the convex portion 23d is inserted may be formed in the case 24.

In this exemplary embodiment, the convex portion 23d is formed in the light guide prism 23 and the opening 24d is formed in the case 24, and vice versa. That is, a convex portion may be formed in the case 24 and a concave portion into which the convex portion of the case 24 is inserted may be formed in the light guide prism 23.

In the first to third exemplary embodiments, the light source 22 is disposed in one end surface of the light guide prism 23 in the main scanning direction. However, the light source 22 may be disposed in each of both ends of the light guide prism 23 in the main scanning direction. The configuration in which the two light sources 22 are used may be appropriately used in the third exemplary embodiment.

In the third exemplary embodiment, the region corresponding to the length L3 in the light guide prism 23 can mainly reflect the light from one of the light sources 22. The region corresponding to the length L4 in the light guide prism 23 can mainly reflect the light from the other of the light sources 22.

In the third exemplary embodiment, the deformation amount (expansion amount) of the region corresponding to the length L3 or the deformation amount (expansion amount) of the region corresponding to the length L4 can be suppressed. Accordingly, the reflection characteristic of the light from the two light sources 22 can be made difficult to be changed.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image forming apparatus comprising:
    a light source which generates light used for reading an image;
    a light guide prism which extends in a main scanning direction and guides the light from the light source toward an image reading region;
    a holding unit which is connected to a part of the light guide prism to hold the light guide prism, has a wall surface distant from a first end surface of the light guide prism in the main scanning direction and facing a second end surface of the light guide prism, and has a linear expansion coefficient smaller than that of the light guide prism, wherein a clearance space is formed between the second end surface of the light guide prism and the wall surface in the main scanning direction;
    an image sensor which photoelectrically converts reflected light from the image reading region and outputs image data corresponding to the read image; and
    an image forming unit which forms an image on a sheet based on the image data of the image sensor.

2. The apparatus according to claim 1, wherein the holding unit includes a case receiving the light guide prism.

3. The apparatus according to claim 1,
    wherein the first end surface of the light guide prism in a longitudinal direction is connected to the holding unit, and
    wherein the second end surface of the light guide prism in the longitudinal direction is distant from the wall surface.

4. The apparatus according to claim 1, wherein the light guide prism includes a connection portion connected to the holding unit on a surface extending in the main scanning direction.

5. A method of manufacturing a light guide, comprising:
    preparing a light guide prism which extends in a main scanning direction and guides light from a light source toward an image reading region;
    preparing a holding unit which is connected to a part of the light guide prism to hold the light guide prism and has a linear expansion coefficient less than that of the light guide prism, wherein a clearance space is formed between a first end surface of the light guide prism and a wall surface of the holding unit in the main scanning direction that faces the first end surface; and
    attaching the light guide prism to the holding unit so that a second end surface of the light guide prism in the main scanning direction is distant from the wall surface of the holding unit facing the first end surface.

6. An image reading device comprising:
    a light source which generates light used for reading an image;
    a light guide prism which extends in a main scanning direction and guides the light from the light source toward an image reading region;
    a holding unit which is connected to a part of the light guide prism to hold the light guide prism, has a wall surface distant from a first end surface of the light guide prism in the main scanning direction and facing a second end surface of the light guide prism, and has a linear expansion coefficient smaller than that of the light guide prism, wherein a clearance space is formed between the second end surface of the light guide prism and the wall surface in the main scanning direction; and
    an image sensor which photoelectrically converts reflected light from the image reading region and outputs image data corresponding to the read image.

7. The device according to claim 6, wherein the holding unit includes a case receiving the light guide prism.

8. The device according to claim 6, wherein the holding unit reflects light from the light guide prism that does not travel toward the image reading region, toward the light guide prism.

9. The device according to claim 6, wherein the holding unit includes a base member holding the light guide prism and a stopper member including the wall surface.

10. The device according to claim 6, wherein the light source is fixed to the first end surface of the light guide prism in a longitudinal direction.

11. The device according to claim 6, wherein the light source is fixed to the first and second end surfaces of the light guide prism in the longitudinal direction.

12. The device according to claim 6, further comprising:
    an optical system which guides the reflected light from the image reading region toward the image sensor.

13. The device according to claim 6,
   wherein the second end surface of the light guide prism in the longitudinal direction is connected to the holding unit, and
   wherein the first end surface of the light guide prism in the longitudinal direction is distant from the wall surface.

14. The device according to claim 13, wherein Expression (1) below is satisfied, $$L1-L2 \geq (\alpha 2 \times L2 - \alpha 1 \times L1)\Delta T \quad (1),$$

where L1 is a distance between a pair of wall surfaces of the holding unit with the light guide prism interposed therebetween in the main scanning direction, L2 is a length of the light guide prism in the main scanning direction, $\alpha 1$ is a linear expansion coefficient of the holding unit, $\alpha 2$ is a linear expansion coefficient of the light guide prism, and $\Delta T$ is an absolute value of a variation in temperature.

15. The device according to claim 6, wherein the light guide prism includes a connection portion connected to the holding unit on a surface extending in the main scanning direction.

16. The device according to claim 15, wherein the connection portion is located at a center of the light guide prism in the longitudinal direction.

17. The device according to claim 15,
   wherein the connection portion includes a convex portion protruding from the surface extending in the main scanning direction, and
   wherein the holding unit includes a concave portion engaging with the convex portion.

18. The device according to claim 15, wherein
   wherein the connection portion includes a concave portion depressed from the surface extending in the main scanning direction, and
   wherein the holding unit includes a convex portion engaging with the concave portion.

19. The device according to claim 15, wherein the first and second end surfaces of the light guide prism in the longitudinal direction are distant from the wall surfaces of the holding unit facing the first and second end surfaces, respectively.

20. The device according to claim 19, wherein Expressions (2) and (3) below are satisfied, $$W1 \geq (\alpha 2 - \alpha 1) \times L3 \times \Delta T/(1 - \alpha 1 \times \Delta T) \quad (2), \text{ and}$$

$$W2 \geq (\alpha 2 - \alpha 1) \times L4 \times \Delta T/(1 - \alpha 1 \times \Delta T) \quad (3)$$

where W1 is a gap between the second end surface of the light guide prism and the wall surface of the holding unit facing the second end surface, W2 is a gap between the first end surface of the light guide prism and the wall surface of the holding unit facing the first end surface, L3 is a length from the connection portion to the second end surface of the light guide prism in the main scanning direction, L4 is a length from the connection portion to the first end surface of the light guide prism in the main scanning direction, $\alpha 1$ is a linear expansion coefficient of the holding unit, $\alpha 2$ is a linear expansion coefficient of the light guide prism, and $\Delta T$ is an absolute value of a variation in temperature.

\* \* \* \* \*